L. S. FLATAU.

WIRE TIGHTENER.

No. 11,201. Reissued Nov. 3, 1891.

ATTEST:

J. A. Hundley

M. E. Foster

INVENTOR:

Louis S. Flatau

By

J. N. McIntire

Attorney

UNITED STATES PATENT OFFICE.

LOUIS S. FLATAU, OF PITTSBURG, TEXAS.

WIRE-TIGHTENER.

SPECIFICATION forming part of Reissued Letters Patent No. 11,201, dated November 3, 1891.

Original No. 397,635, dated February 12, 1889. Application for reissue filed September 7, 1891. Serial No. 405,046.

*To all whom it may concern:*

Be it known that I, LOUIS S. FLATAU, of Pittsburg, in the county of Camp and State of Texas, have invented a new and useful Improvement in Wire-Tighteners, of which the following is a specification.

My invention is an improved wire-tightener especially designed for use in the tightening of wires in the construction of fences and in taking up slack after such fences have been constructed, but which instrument is also capable of use in tying packages with wire, binding planks to posts, and in other instances where it is desirable to tighten wire and secure it when so tightened.

The invention consists, broadly, in a wire-tightener having a frame provided with guides for the wire and with a threaded bearing, a screw turning in said bearing, and a hook on said screw to engage the wire.

The invention consists, further, in a wire-tightener having a screw, a frame having a threaded bearing for such screw, a hook swiveled on the screw, and a shackle for keying the hook to the screw.

The invention consists, further, of a frame having two guides fixed with relation to each other and adapted to guide the wire, and a rotatable looper movable between said guides, whereby it may draw the wire between the same and twist it to secure the portion so drawn.

The invention consists, further, in other improved constructions and combinations of parts, as will be hereinafter described and claimed.

Figure 1:
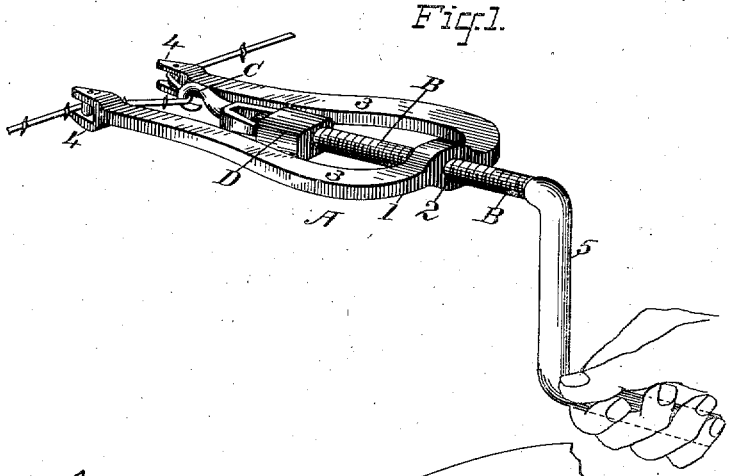
Figure 2:
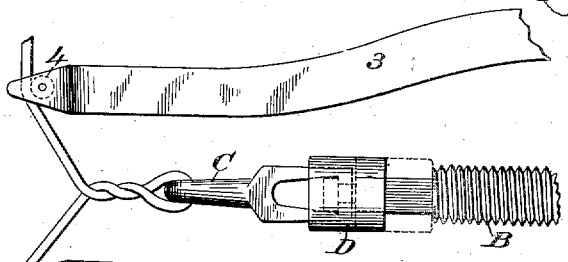
Figure 3:
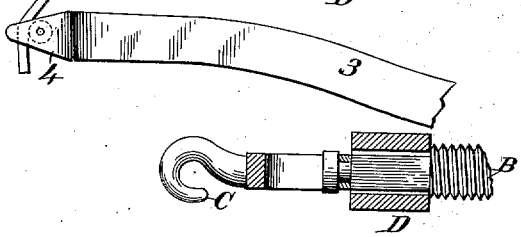

In the drawings, Figure 1 is a perspective view of my improvement. Fig. 2 is a partial plan thereof; and Fig. 3 is a detail sectional view, all of which will be described.

In the construction shown the device comprises a frame A, a screw B, a hook C, and a shackle D. The frame A is preferably made in the approximately U shape shown, having the crown portion 1, provided with threaded bearing 2, and having the arms 3, provided at their free ends with guides 4 for the wire, such guides being preferably made in the bifurcated form shown and provided with anti-friction pulleys to facilitate the passage of the wire. The screw B is fitted and turns in bearing 2, has at its outer end a handle 5 or other suitable device by which it may be turned, and is provided at its inner end with the hook C to engage the wire.

While I show and describe the hook, it is obvious that any equivalent construction suited to secure the wire might be substituted therefor without departing from some of the broad features of my invention; but I prefer to employ the hook. I also prefer to swivel the hook on the screw, so that such hook may move longitudinally with the screw without turning, and to provide a shackle by which to key or shackle the hook rigidly to the screw. This shackle might be a pin passed through transverse coincident openings in the hook and the screw; but I prefer to construct it in sleeve form, having non-circular openings to fit on corresponding portions of the hook and screw, and movable longitudinally on one of such parts—usually the screw—so that it may be adjusted to engage the hook also, and so key or shackle the parts together.

In the operation of stretching a wire strung between two posts or other objects and secured thereto the device is applied as shown in Fig. 1, the hook engaged with the wire, and the screw turned to draw the wire between the guides and up, forming a loop within the frame. The screw and its connected parts may thus be called a "looper," as they form the loop within the frame. After the wire has been drawn as far into the frame as is desired or expedient the hook is shackled to the screw, and the latter is again turned to effect a twisting of the wire in order to secure the loop which has been drawn up. In turning the screw to effect this twisting it is preferred to reverse its motion, so that as the loop is twisted the screw will move down toward its starting-point, this back turning of the screw compensating for the wire taken up in the twisting of the same. Now it is obvious that the hook might be permanently keyed to the screw, so that the wire would be twisted as it is drawn up; but I prefer to use the swiveled hook and to form the loop before twisting the wire to secure the portion of slack taken up, as such operation is easier and less liable to break or otherwise damage the wire.

By my invention it will be seen I provide a wire-tightener having two guides fixed with reference to each other, and a rotating looper operating between such guides, whereby such looper will operate to draw the wire up between said guides, and also twist it to secure the portion so taken up.

To tie a plank to a post or to tie up a package, the wire is passed around the same and its ends are engaged with the hook, and the screw is operated to draw such wire tight and then to twist and secure it, as will be understood from the foregoing description.

Having thus described my invention, what I claim as new is—

1. The improved wire-tightener consisting of a frame having opposite guides and a central bearing, the screw threaded in said bearing, the hook swiveled on said screw, and the shackle whereby to key the hook to the screw, substantially as set forth.

2. In a wire-tightener, the combination of guides for the wire and a looper movable longitudinally and rotatably, whereby to draw the wire into a loop between said guides and twist it, substantially as set forth.

3. In a wire-tightener, the combination, with devices adapted to guide the wire and between which the latter may be drawn or pulled with a loop to take up the slack, of a looper device movable longitudinally and also rotatable, as specified, whereby the wire may be drawn into a loop to take up the slack and then have the loop twisted to prevent the latter from being pulled out by the tension of the taut wire, all substantially as set forth.

4. A wire-tightener comprising a frame having two guides fixed with relation to each other and adapted to guide the wire, and a rotatable looper movable longitudinally between the said fixed guides, whereby it may draw the wire between the same and twist it to secure the portion so drawn, substantially as set forth.

5. In a wire-tightener, substantially as described, the combination of a frame having a threaded bearing, a screw turning in said bearing, a hook swiveled on said screw, and a shackle by which to key said hook on the screw, substantially as set forth.

6. In a wire-tightener, the combination of a frame having a threaded bearing, a screw turning in said bearing, a hook swiveled on said screw, such hook and screw having adjacent non-circular portions, and a sleeve having non-circular bores or openings fitted to said portions and constituting a shackle whereby to key the hook on the screw, substantially as set forth.

7. An improved wire-tightener comprising an approximately U-shaped frame having at the ends of its arms guides for the wire and provided centrally with a threaded bearing, and the screw turning in said bearing and provided with a hook, substantially as set forth.

8. The improved wire-tightener herein described, consisting of the U-shaped frame having guides for the wire and provided centrally with a threaded bearing, the screw turning in said bearing, the hook swiveled on said screw, and the sleeve forming a shackle by which to key the hook to the screw, all substantially as and for the purposes specified.

L. S. FLATAU.

Witnesses:
W. V. HEATH,
I. W. DUFFEY.